United States Patent
Chana et al.

(10) Patent No.: US 8,315,303 B1
(45) Date of Patent: Nov. 20, 2012

(54) PHASE PRE-EMPHASIS FOR A SERIAL DATA TRANSMITTER

(75) Inventors: Jatinder Chana, Burnaby (CA); Jurgen Hissen, Port Moody (CA); Hossein Hashemi, St-Laurent (CA)

(73) Assignee: PMC-Sierra, Inc., Sunnyvale, CA (US)

( * ) Notice: Subject to any disclaimer, the term of this patent is extended or adjusted under 35 U.S.C. 154(b) by 1244 days.

(21) Appl. No.: 12/110,210

(22) Filed: Apr. 25, 2008

(51) Int. Cl.
*H03K 7/08* (2006.01)
*H03K 9/08* (2006.01)

(52) U.S. Cl. ........... 375/238; 375/296; 332/109; 455/43

(58) Field of Classification Search .......... 375/238, 375/296; 332/109; 455/43
See application file for complete search history.

(56) References Cited

U.S. PATENT DOCUMENTS

| | | | | |
|---|---|---|---|---|
| 5,272,705 A * | 12/1993 | Okamoto | | 714/716 |
| 6,256,329 B1 * | 7/2001 | Ishizuka et al. | | 372/38.02 |
| 6,518,792 B2 * | 2/2003 | Jong et al. | | 326/87 |
| 6,697,420 B1 * | 2/2004 | Simon et al. | | 375/220 |
| 7,112,989 B2 * | 9/2006 | Ooshita et al. | | 326/27 |
| 7,233,165 B2 * | 6/2007 | Jordy | | 326/29 |
| 7,378,893 B1 * | 5/2008 | Kang | | 327/291 |
| 2001/0030622 A1 * | 10/2001 | Haycock | | 341/144 |
| 2003/0193351 A1 * | 10/2003 | Fukui | | 326/83 |
| 2005/0057280 A1 * | 3/2005 | Groen et al. | | 326/86 |
| 2005/0207761 A1 * | 9/2005 | Ikeuchi | | 398/198 |
| 2008/0069267 A1 * | 3/2008 | Marlett et al. | | 375/296 |
| 2009/0116564 A1 * | 5/2009 | Chen et al. | | 375/257 |

OTHER PUBLICATIONS

Buckwalter, et al.; Phase and Amplitude Pre-emphasis Techniques for Low-Power Serial Links; IEEE Journal of Solid-State Circuits; Jun. 2006; pp. 1391-1399; vol. 41, No. 6.

Buckwalter, James F.; Deterministic Jitter in BroadBand Communication; PhD Thesis; California Institute of Technology; 2006; Pasadena, California.

* cited by examiner

*Primary Examiner* — Shuwang Liu
*Assistant Examiner* — Sung Ahn
(74) *Attorney, Agent, or Firm* — Knobbe Martens Olson & Bear LLP (57) ABSTRACT

Apparatus and methods apply pre-emphasis to the phase rather of a signal than to the amplitude of a single. This approach can provide superior pre-emphasis performance than the conventional amplitude pre-emphasis techniques in certain situations, such as when a non-linear slicer is present in the signal path. For example, electrical-to-optical (E/O) and optical-to-electrical (O/E) converters can effectively slice a signal.

18 Claims, 8 Drawing Sheets

Example: detect isolated bit, 00100 or 11011

TPD: 1010100100010110111010
TPM: 0000000100000001000000

PHASE PRE-EMPHASIS FOR A SERIAL DATA TRANSMITTER

BACKGROUND

1. Field of the Invention

The invention generally relates to electronics, and in particular, to high-speed communications devices.

2. Description of the Related Art

Figure 1A:
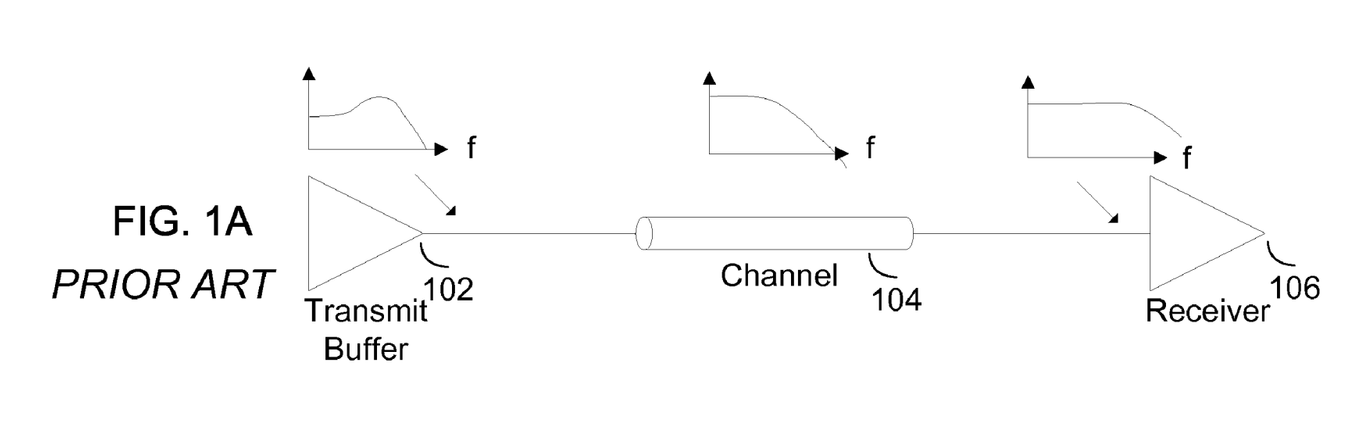
FIG. 1A illustrates the effect of amplitude pre-emphasis on a typical linear channel having a low-pass response.

A common technique used to compensate for channel loss in high-speed serializer/deserializer (SERDES) links is known as transmit amplitude pre-emphasis. A channel 104 has a low-pass response. An example of amplitude pre-emphasis is illustrated in FIG. 1A. That technique pre-distorts transmit signal pulses in amplitude levels based on preceding and/or following data bits so as to reduce residual Inter Symbol Interference (ISI) at the Receiver (Rx) input after the channel. In general, amplitude pre-emphasis boosts the high frequency content of the transmit signal pulses to complement high frequency losses in the channel 104. This works in practice if the channel 104 is linear, which is a valid assumption for backplane applications. However, for non-linear channels, amplitude pre-emphasis is not directly applicable.

With reference to FIG. 1A, the frequency spectrum at the output of the transmit buffer 102 shows the boost in high frequency content of the transmit signal generated by amplitude pre-emphasis to counter act against the higher high frequency loss of the channel 104. At the receiver 106, an overall flat response can be obtained, which lowers inter-symbol interference (ISI).

Figure 1B:
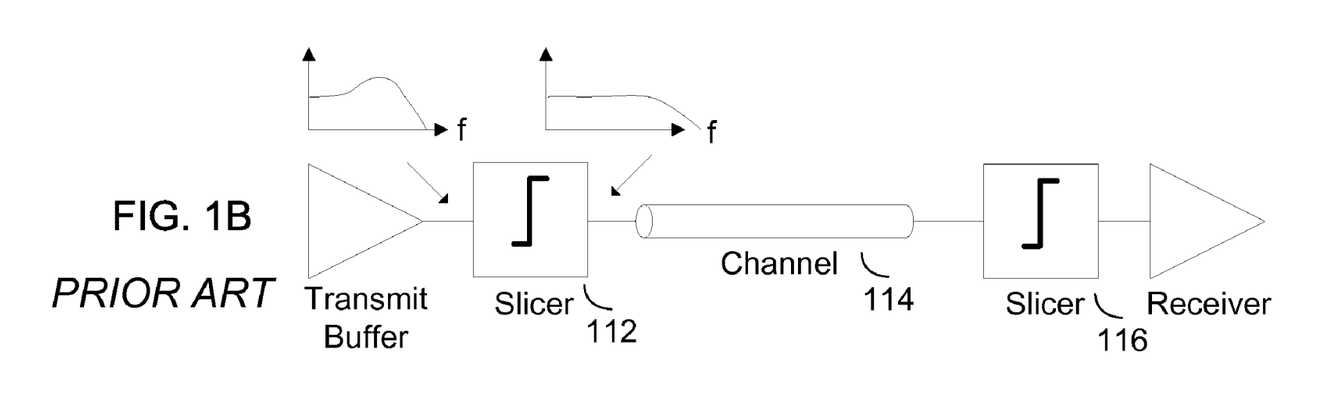
FIG. 1B illustrates that pre-emphasis does not work well for non-linear channels that have signal slicers.

FIG. 1B illustrates that pre-emphasis does not work well for channels 114 that have signal slicers 112, 116. An example of a non-linear channel is a channel in an optical network. For example, optical-to-electrical (O/E) and electrical-to-optical (E/O) converters act as slicers 112, 116. The high frequency boost from amplitude pre-emphasis is effectively removed by the slicer 112 and, in turn, cannot effectively compensate for channel loss and results in larger loss of high frequency content of the signal. Thus, isolated pulses, which have larger high-frequency content compared to other signal bits, are attenuated more and their amplitude is reduced, making isolated pulses the weak link in the transmission channel. This situation is further exacerbated by Pulse Width Shrinkage (PWS), which can occur in O/E and E/O converters. With sufficient loss in the channel 114, isolated pulses are missed by the slicer 116 on the receive side, which results in increased bit errors.

SUMMARY

For non-linear channels, amplitude pre-emphasis is not sufficient to compensate for high-frequency loss that exists in the channel. Isolated pulses in the data stream are affected most adversely by the low-pass response of a channel because isolated pulses contain mostly high-frequency content. Compared to the rest of the data stream, this effectively diminishes the isolated pulse both in amplitude and width after passing through the channel. To alleviate this degradation one method overcomes channel degradation of isolated pulses by widening isolated pulses (in time) before transmission, which mitigates against the loss of high-frequency signal content.

BRIEF DESCRIPTION OF THE DRAWINGS

These drawings and the associated description herein are provided to illustrate specific embodiments of the invention and are not intended to be limiting.

DETAILED DESCRIPTION OF SPECIFIC EMBODIMENTS

Although particular embodiments are described herein, other embodiments, including embodiments that do not provide all of the benefits and features set forth herein, will be apparent to those of ordinary skill in the art. While the phase pre-emphasis techniques will be illustrated in the context of complementary metal oxide semiconductor (CMOS), the principles and advantages described herein are also applicable to other types of logic circuits, such as, but not limited to, current mode logic (CML). In FIGS. 2-5, thick data lines indicate parallel data and thin data lines indicate serial data.

Figure 2:
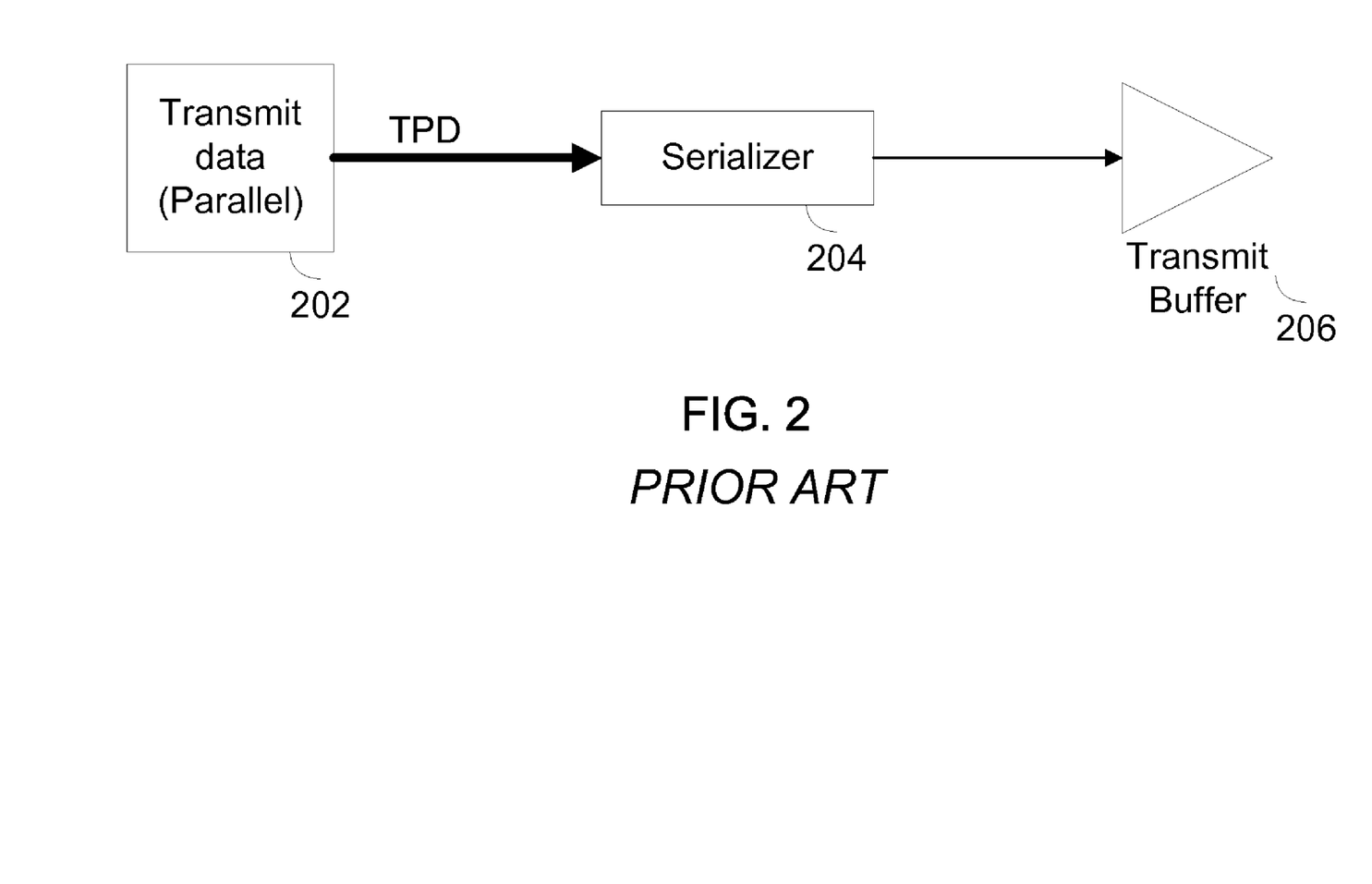
FIG. 2 illustrates an example of a conventional transmit path in a serializer/deserializer (SERDES).

FIG. 2 illustrates an example of a conventional transmit path in a serializer/deserializer (SERDES). Parallel data 202 is presented to the interface (serializer 204), which converts the transmit parallel data (TPD) 202 to a serial bitstream, and provides the serial bitstream to a transmit buffer 206. The transmit buffer 206 converts the digital signal bits at its input to voltage levels at its output. Conventionally, the transmit buffer 206 will take certain specific voltage levels, for example, for CMOS or CML, at its input and converts them to desired output voltage levels without altering the width of the pulses. The serializer 204 will be described in greater detail later in connection with FIG. 4.

Figure 3:
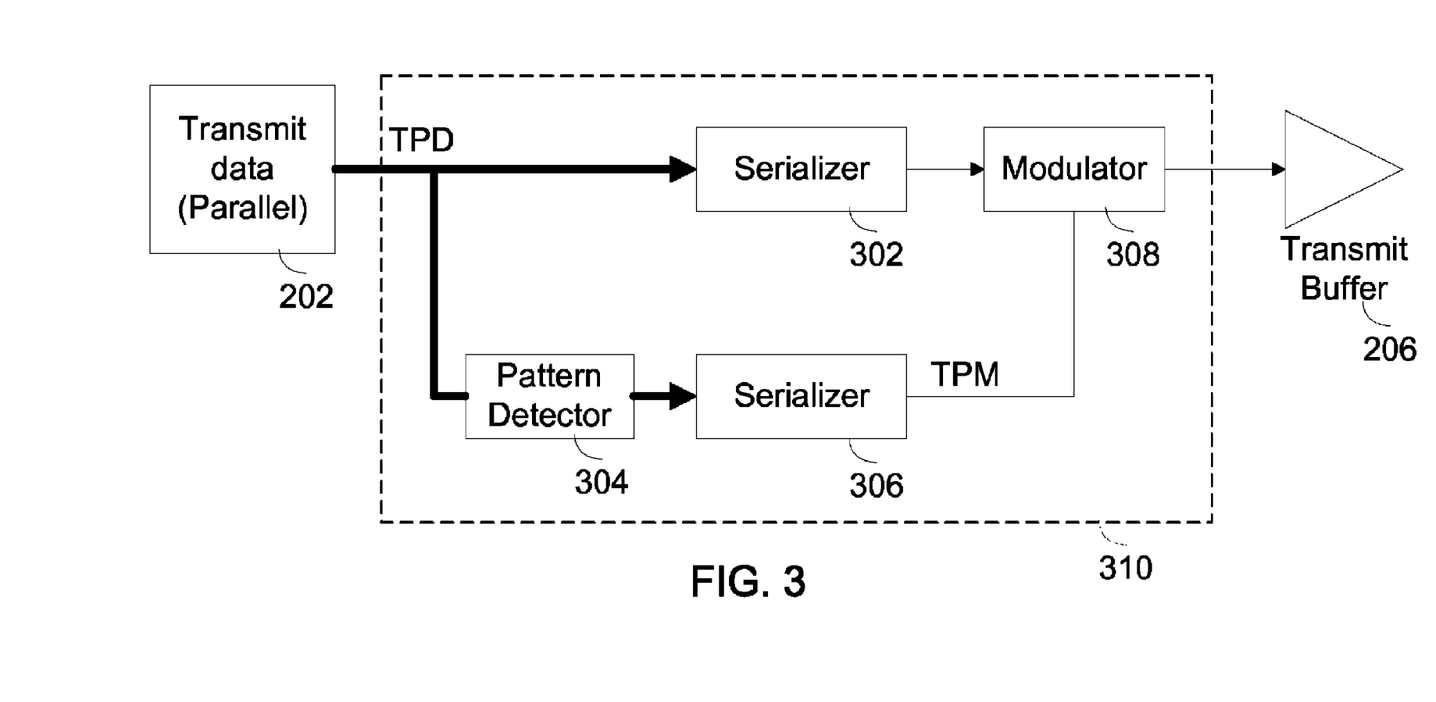
FIG. 3 illustrates an example of an embodiment of a transmit path with phase pre-emphasis.

FIG. 3 illustrates an example of an embodiment of a transmit path with phase pre-emphasis. The phase pre-emphasis compensates for the loss of high frequency signal content for isolated pulses due to non-linear channel loss. In the embodiment illustrated in FIG. 3, the phase pre-emphasis technique modulates the pulse width of selected pulses in the transmit data stream path before the transmit buffer 206.

The transmit path includes a first serializer 302, a pattern detector 304, a second serializer 306, a modulator 308, and the transmit buffer 206. For proper function, a selected data bit is modulated in the transmit data stream. The first serializer 302 converts the transmit parallel data TPD to a serial bitstream.

The pattern detector 304 detects specific data patterns in data stream. The pattern detector 304 can be implemented by, for example, by a circuit that XORs the transmit parallel data with the desired pattern, and then ANDing the outputs of the XOR gates. In the illustrated embodiment, the pattern detection is done on the parallel data. The second serializer 306 outputs a coded bitstream TPM corresponding bit-for-bit to the TPD bit stream. The modulator 308 is configured to modulate selected TPD bits based on the coded TPM bitstream. The pattern detector 304, the serializers 302, 306 and the modulator 308 form a data serializer 310, which will be described in greater detail later in connection with FIG. 5.

Figure 4:
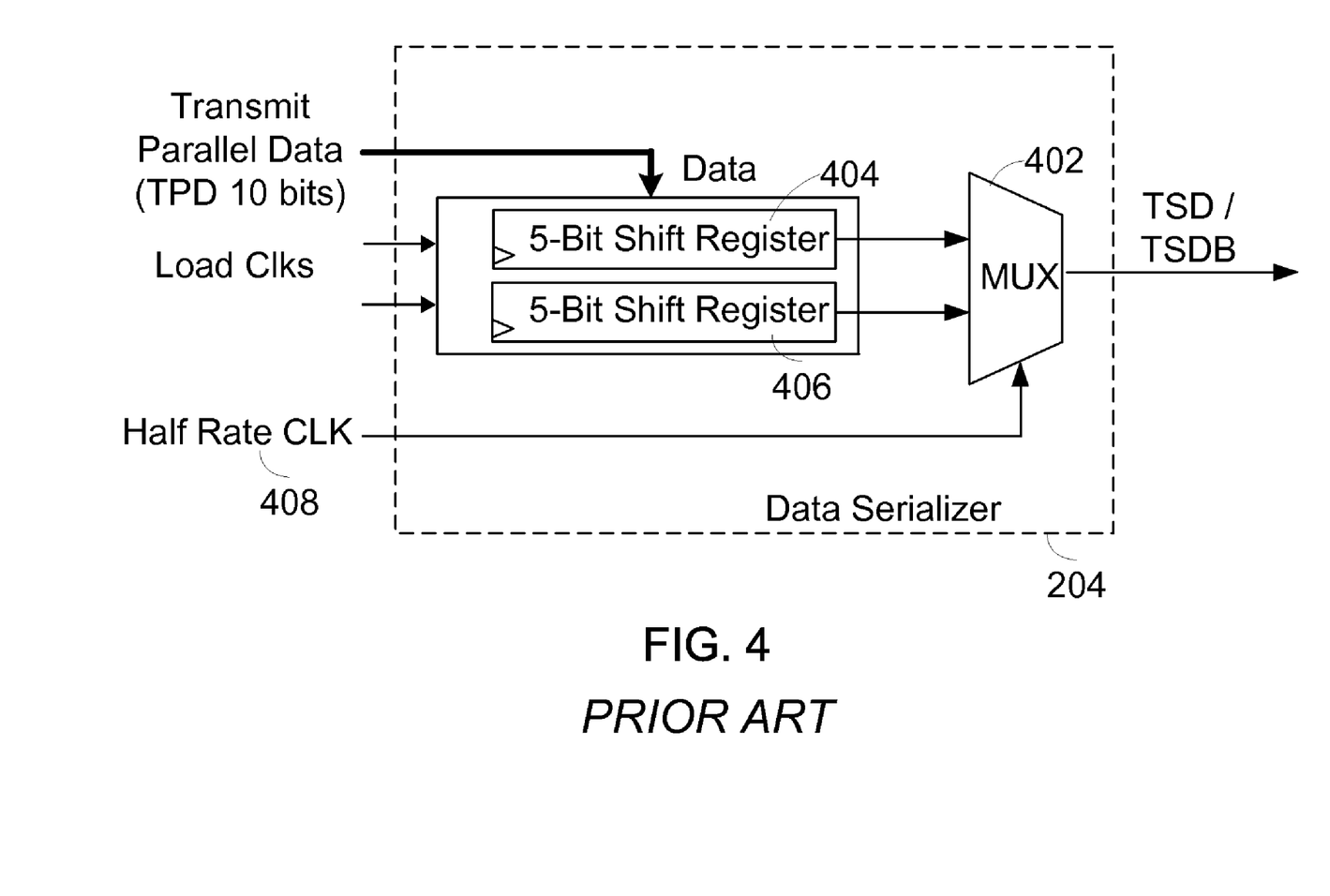
FIG. 4 illustrates an example of a conventional half-rate, 10 to 1, parallel-in, serial out (PISO) parallel-to-serial converter.

FIG. 4 illustrates an example of a conventional 10 to 1, half-rate, parallel-in, serial out (PISO) parallel-to-serial converter 204 (data serializer). Variations of the illustrated example will be readily apparent to one of ordinary skill in the art. The 10-bit PISO 204 is a half-rate implementation that performs serialization in two stages: (1) the parallel input data (TPD) is serialized into ODD and EVEN bitstreams; and (2) then converted to serial data with a final 2:1 PISO, which is implemented as a multiplexer 402 between ODD and EVEN data.

The input parallel 10-bit data is loaded into two 5-bit shift registers 404, 406, one has only ODD bits, while the second has only EVEN bits. The data is serialized by the final multiplexer 402 which is controlled by a half-rate clock signal 408. When the half-rate clock signal 408 is "high," a bit from the upper shift register 404 is provided by the multiplexer 402 as an output on TSD/TSDB, and when the half-rate clock signal 408 is "low," a bit from the lower shift register 406 is provided as an output from the multiplexer 402 as an output. Thus the data is continuously outputted alternatively from ODD and EVEN shift registers 404, 406. These registers are also shifted continuously, but care is required in the timing so that they do not transition while data is being shifted out to the output TSD/TSDB.

Figure 5:
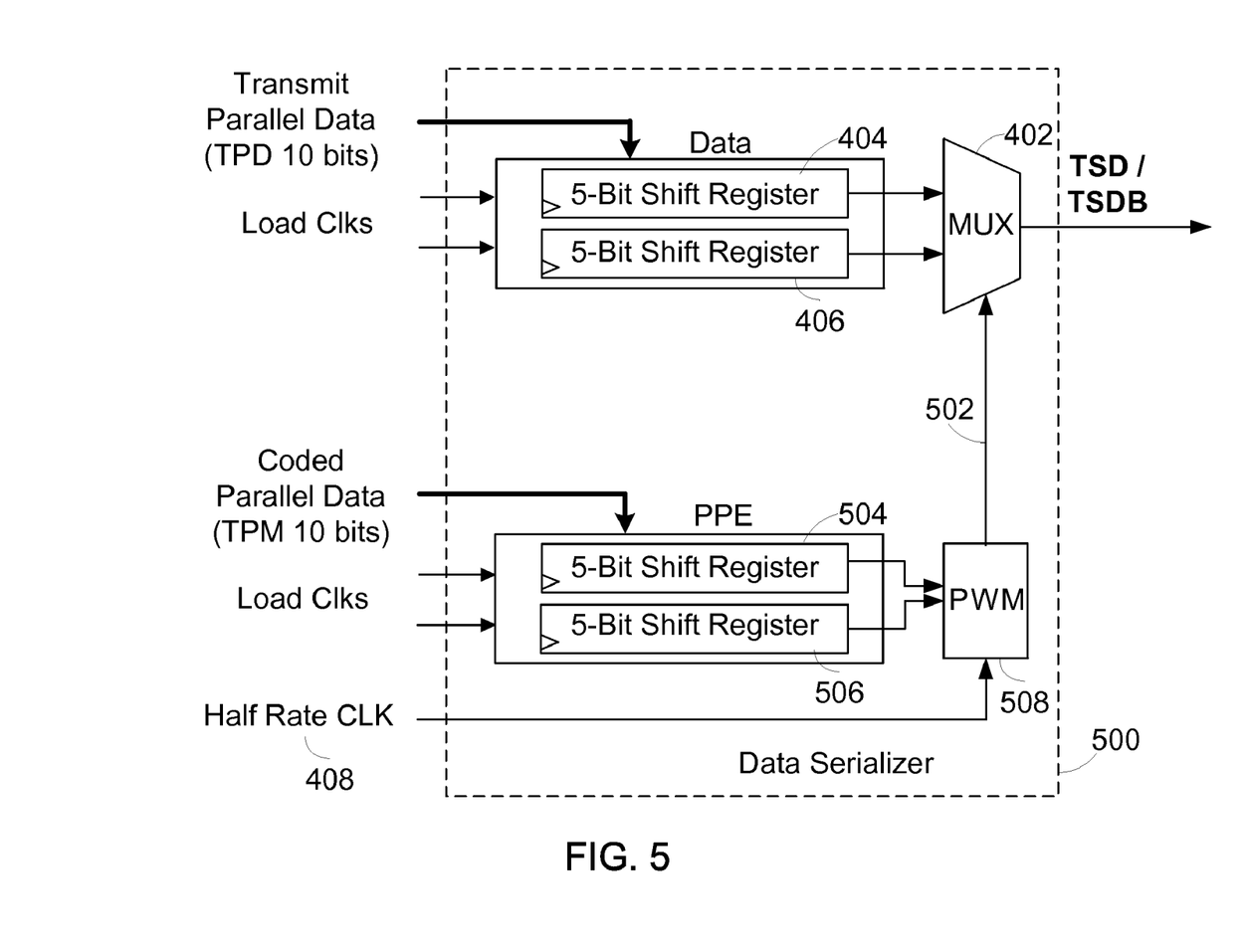
FIG. 5 illustrates an embodiment of a half-rate, 10 to 1, parallel-in, serial out (PISO) parallel-to-serial converter with phase pre-emphasis.

FIG. 5 illustrates an embodiment of a 10 to 1 half-rate, parallel-in, serial out (PISO) parallel-to-serial converter 500 with phase pre-emphasis. The illustrated embodiment shares components with the conventional PISO described earlier in connection with FIG. 4.

Figure 6:
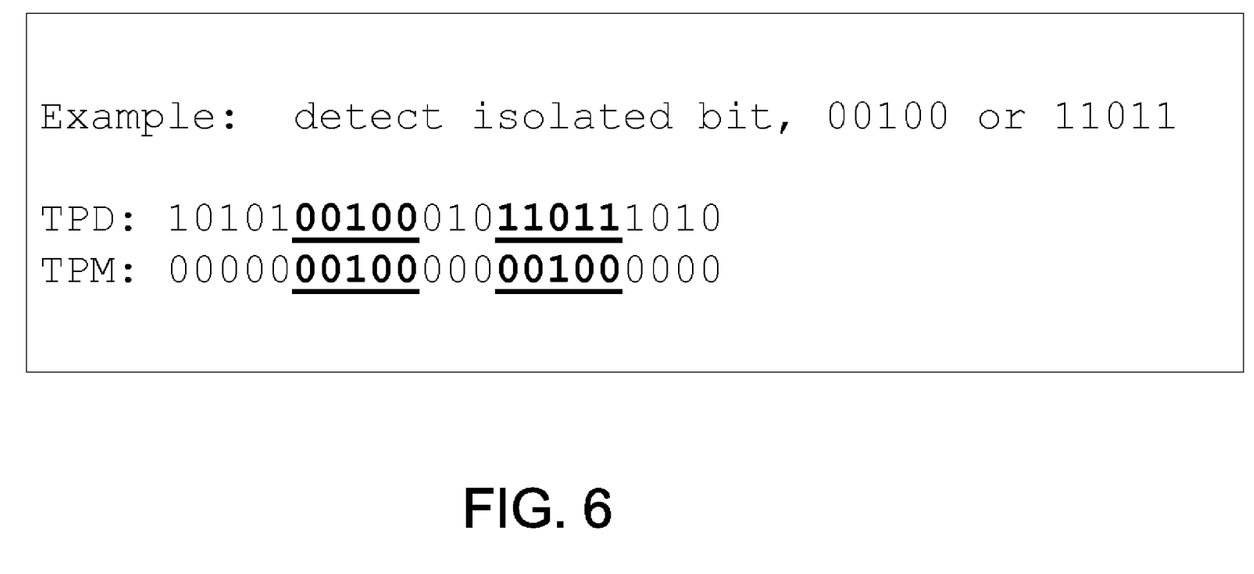
FIG. 6 illustrates an example of a coded data pattern for detected isolated pulse.

The coded parallel data, for example, outputs of the pattern detector 304 (FIG. 3) are loaded into an upper auxiliary shift register 504 or a lower auxiliary shift register 506. In the illustrated example, when no isolated bit is applicable, the upper auxiliary shift register 504 and the lower auxiliary shift register 506 are filled with zeroes for the coded parallel data. FIG. 6 illustrates an example of coded parallel data for loading when an isolated bit is detected. The pulse width modulator (PWM) 508 modifies selected pulse widths of the half-rate clock signal 408 to generate the modified half-rate clock signal 502. One embodiment of the PWM 508 will be described in greater detail later in connection with FIG. 7.

In the illustrated embodiment, pulse widening for isolated pulses is accomplished by modifying the duty cycle of a modified half-rate clock signal 502 that controls the multiplexer 402. If an isolated bit is present in the upper 5-bit transmit data shift register 404, the duty cycle of the modified half-rate clock signal 502 is increased. An increase in the duty cycle of the modified half-rate clock signal 502 increases the width of the isolated bit at the output TSD/TSDB of the multiplexer 402 when the isolated bit is shifted out of the upper 5-bit transmit data shift register 404.

If the isolated bit is present in the lower 5-bit transmit shift register 406, the duty cycle of the modified half-rate clock signal 502 is decreased. A decrease in the duty cycle increases the width of the isolated bit at the output TSD/TSDB of the multiplexer 402 when the isolated bit is shifted out of the lower 5-bit transmit shift register 406.

To apply phase emphasis to an isolated bit, the presence of an isolated bit in the parallel data (TPD) is first detected before serialization, and a corresponding marker for the isolated bit is generated in the coded pattern bit stream (TPM). An example for detecting an isolated bit that is surrounded by no transitions for 2 bits on either side is illustrated FIG. 6.

The data pattern "00100" and its complement "11011" are to be detected in the parallel data (TPD). In FIG. 6, these data patterns are drawn in bold and underline. A corresponding marker is added to the coded pattern bit stream (TPM) as shown (again in bold and underline). As both TPD and TPM data is serialized, the marker on the coded pattern bit stream (TPM) is used to modify the duty cycle of the original half-rate clock signal 408 to generate the modified half-rate clock signal 502 that controls the multiplexer 402.

One embodiment in a CMOS implementation is described in connection with FIG. 7. An upper waveform 702 illustrates both the 00100 and 11011 data patterns. A waveform labeled 408 depicts the half-rate clock signal 408.

A dashed box 508 represents the PWM 508 (FIG. 5). A waveform labeled 502 depicts the modified half-rate clock signal 502. In the illustrated embodiment, the duty cycle is modified using a 3-stateable buffer 704 (inverting buffer shown, but a non-inverting buffer can also be used) that activates high or low depending on whether the marked bit is in the ODD or EVEN path. The pulse width modulation circuit has an output in parallel with the output of the clock driver such that when enabled, the output of the pulse width modification circuit is in contention with the output of the clock driver. A control circuit is configured to enable the output of the pulse width modification circuit for an emphasis period that encompasses a half clock cycle to be stretched, at least a portion of a preceding half cycle, and at least a portion of a subsequent half cycle. Alternatively to a 3-stateable gate, an open-drain type of circuit can be used as shown in FIG. 8. The output of the 3-stateable buffer 704 intentionally contends with an output of a half-rate clock driver 706 for an emphasis window 708 when the isolated bit is to appear on the output data TSD. The illustrated emphasis window is 3-bits; however, other bit widths, including fractional widths are also applicable and will be readily determined by one of ordinary skill in the art.

Figure 7:
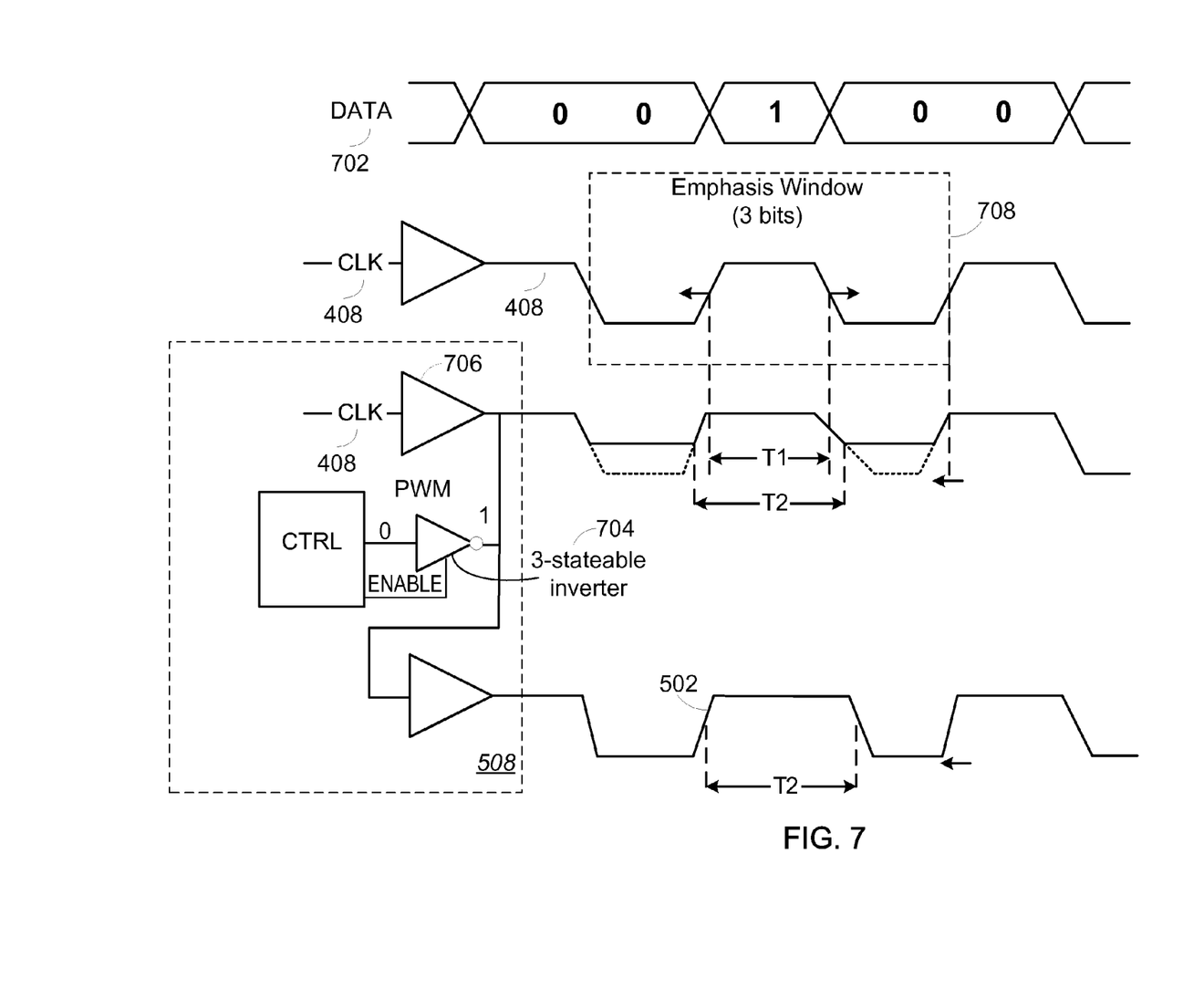
FIG. 7 illustrates an example of duty cycle insertion for an isolated pulse in a PISO.
Figure 8:
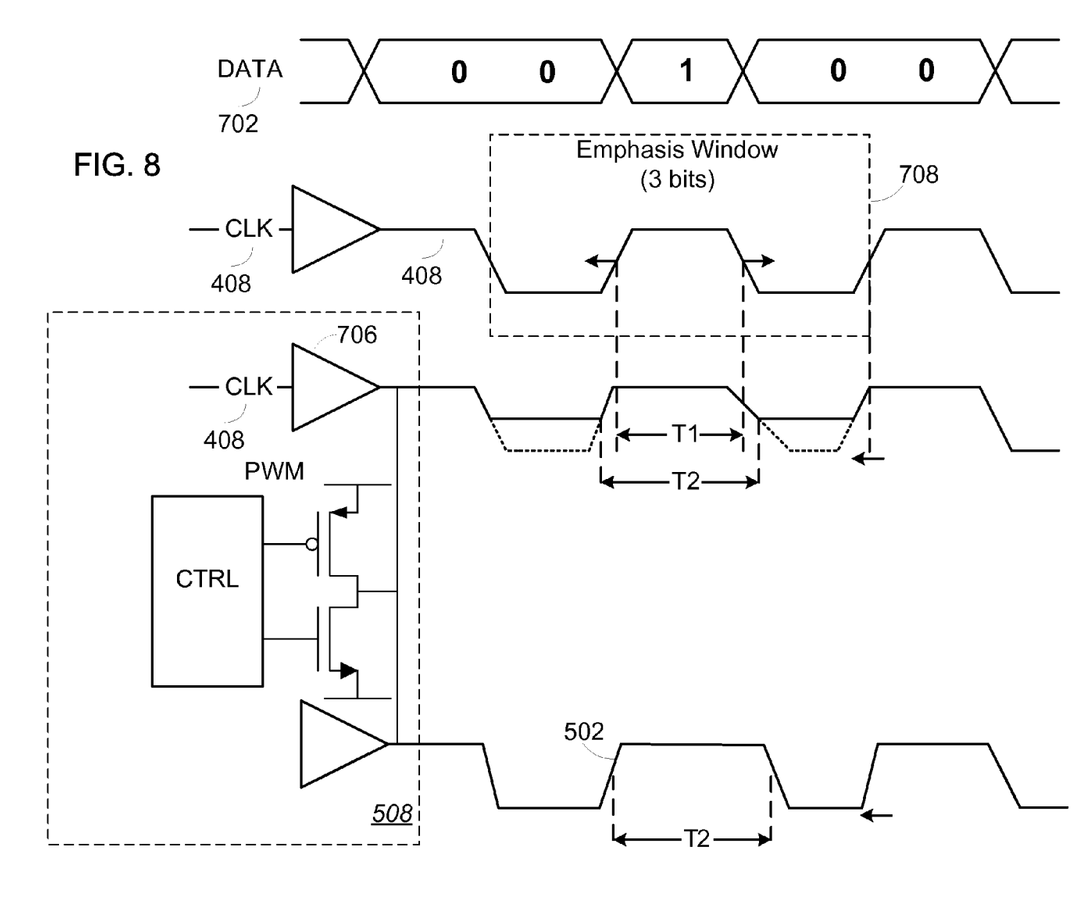
FIG. 8 illustrates an example of an open drain circuit.

The case in which the 3-stateable buffer 704 goes high is illustrated in FIG. 7. The duty cycle of the half-rate clock signal 408 is increased to generate the modified half-rate clock signal 502, such that the time period (half-cycle) used for the isolated bit increases from T1 to T2 as illustrated in FIG. 7. The data before and after the emphasis window 708 should have the nominal pulse width T1, but the isolated pulse in the emphasis window is widened to T2. The amount of duty cycle introduced is determined by the drive strength of the 3-stateable buffer 704 relative to the drive strength half-rate clock buffer 706. This drive strength can be made to be programmable.

The principles and advantages of the described techniques can be expanded to other PISO implementations and is not limited to the specific embodiments described. For example, the principles and advantages can also be applied to full-rate PISO architectures or CML implementation of PISO. The way the clock signal is modulated would be different, but the effect is the same as the benefits arise from the same predistortion mechanism.

Also, the illustrated phase pre-emphasis technique can also be expanded to other bit patterns that are degraded by non-linear channels, not just the isolated bits illustrated. Embodiments of the invention can be used not only in optical networks, but to any non-return-to-zero (NRZ) transmit pre-distortion circuit used in serial interface technology over linear or non-linear channels.

Embodiments of the invention compensate for pulse width shrinkage (PWS) in non-linear channels, which are poorly compensated with linear equalization. An immediate application is compensation of PWS of isolated pulses in non-linear optical channels that use limiting optical-to-electrical (O/E) or electrical-to-optical (E/O) converters. The phase pre-emphasis can reduce the bit error rate (BER) of the link and can extend the reach of the link.

It will be appreciated by the skilled practitioner that the illustrated process can be modified in a variety of ways. For example, in another embodiment, various portions of the illustrated process can be combined, can be rearranged in an alternate sequence, can be removed, or the like.

Various embodiments have been described above. Although described with reference to these specific embodiments, the descriptions are intended to be illustrative and are not intended to be limiting. Various modifications and applications may occur to those skilled in the art.

What is claimed is:

1. An apparatus for phase pre-emphasis, the apparatus comprising:
    a pattern detector configured to detect one or more patterns in data to be transmitted in a serial data signal;
    a modulator configured to stretch a pulse width of one or more bits of the one or more detected patterns in the serial data signal, wherein the modulator is configured to modify a clock signal to generate the modified clock signal, wherein the modified clock signal has a wider clock pulse than the clock signal for the one or more bits of the one or more detected patterns, wherein the clock signal and the modified clock signal are half rate, the modulator further comprising:
        a clock driver wherein an output of the clock driver is the clock signal;
        a pulse width modulator circuit having an output in parallel with the output of the clock driver such that when enabled, the output of the pulse width modulator circuit is in contention with the output of the clock driver;
        a control circuit configured to enable the output of the pulse width modulator circuit for an emphasis period that encompasses a half clock cycle to be stretched, at least a portion of a preceding half cycle, and at least a portion of a subsequent half cycle; and
        a buffer circuit with an input coupled to both the output of the clock drive and the output of the pulse width modulator circuit; and
    a serializer configured to convert the data from parallel form to serial form, wherein the serializer is configured to receive a modified clock signal as an input for timing of the serial data signal.

2. The apparatus of claim 1, wherein a pattern of the one or more patterns comprises an isolated bit of a first logic state surrounded by two or more preceding bits of a second logic state and two or more subsequent bits of the second state, wherein the second logic state is opposite to the first logic state, wherein the modulator if further configured to stretch the pulse width of the isolated bit relative to surrounding bits.

3. The apparatus of claim 1, wherein the emphasis period is 3 half-cycles long.

4. The apparatus of claim 1, wherein the pulse width modulator circuit comprises a 3-stateable gate.

5. The apparatus of claim 1, wherein the pulse width modulator circuit comprises an open-drain circuit.

6. The apparatus of claim 1, further comprising one or more shift registers configured to hold parallel data to be converted into the serial data signal, wherein the one or more shift registers are configured to output serial data in response to the modified clock signal.

7. The apparatus of claim 1, wherein the modulator is configured to stretch the pulse width by modulation of a duty cycle of a clock signal used for timing the serial data signal.

8. The apparatus of claim 1, wherein the modulator is configured to stretch the pulse width such that after being sent through a transmission channel, the stretched pulse width is received with an undistorted pulse width.

9. An apparatus for phase pre-emphasis, the apparatus comprising:
    means for detecting one or more patterns in data to be transmitted in a serial data signal;
    means for selectively stretching a pulse width of one or more bits of the one or more detected patterns in the serial data signal by:
        modifying a clock signal to generate a modified clock signal, wherein the modified clock signal has a wider clock pulse than the clock signal for the one or more bits of the one or more detected patterns and wherein the clock signal is a half-rate output of a clock driver;
        using the modified clock signal to time the sequence of bits of the serial data signal; and
        selectively stretching the pulse width of the modified clock signal by enabling an output of a pulse width modulator circuit that is in parallel with the clock driver such that the output of the pulse width modulator circuit is in contention with the output of the clock driver, wherein the output of the pulse width modulator circuit is enabled for an emphasis period that encompasses a half clock cycle to be stretched, at least a portion of a preceding half cycle, and at least a portion of a subsequent half cycle.

10. The apparatus of claim 9,
    wherein a pattern of the one or more patterns comprises an isolated bit of a first logic state surrounded by two or more preceding bits of a second logic state and two or more subsequent bits of the second state, wherein the second logic state is opposite to the first logic state, the apparatus further comprising means for selectively stretching the pulse width of the isolated bit relative to pulse widths for surrounding bits.

11. A method for phase pre-emphasis, the method comprising:
    detecting one or more patterns in data to be transmitted in a serial data signal; and
    selectively stretching a pulse width of one or more bits of the one or more detected patterns in the serial data signal and selectively stretching the pulse width by:
        modifying a clock signal to generate a modified clock signal, wherein the modified clock signal has a wider clock pulse than the clock signal for the one or more bits of the one or more detected patterns and wherein the clock signal is at half-rate output of a clock driver;
        using the modified clock signal to time the sequence of bits of the serial data signal; and
        selectively stretching the pulse width of the modified clock signal by enabling a pulse width modulator circuit that is in parallel with the clock driver such that the output of the pulse width modulator circuit is in contention with the output of the clock driver, wherein the pulse width modulator circuit is enabled for an emphasis period that encompasses a half clock cycle to be stretched, at least a portion of a preceding half cycle, and at least a portion of a subsequent half cycle.

12. The method of claim 11,
    wherein a pattern of the one or more patterns comprises an isolated bit of a first logic state surrounded by two or more preceding bits of a second logic state and two or more subsequent bits of the second state, wherein the second logic state is opposite to the first logic state, the method further comprising selectively stretching the pulse width of the isolated bit relative to surrounding bits.

13. The method of claim 11, wherein the emphasis period is 3 half-cycles long.

14. The method of claim 11, wherein the pulse width modulator circuit comprises a 3-stateable gate.

15. The method of claim 11, wherein the pulse width modulator circuit comprises an open-drain circuit.

16. The method of claim 11, wherein selectively stretching the pulse width comprises modifying a duty cycle of a clock signal used for timing the serial data signal.

17. The method of claim 11, further comprising selectively stretching the pulse width such that after being sent through a transmission channel, the stretched pulse width is received with an undistorted pulse width.

18. The method of claim 11, further comprising:
receiving the data in parallel form; and
converting the data to generate the serial data signal.

* * * * *